Oct. 27, 1942.   W. S. REYNOLDS   2,300,361
PRIMED SHELL TESTING APPARATUS
Filed Aug. 3, 1940   4 Sheets-Sheet 1

INVENTOR
WARREN S. REYNOLD.
D. Verner Smythe
ATTORNEYS

Oct. 27, 1942.  W. S. REYNOLDS  2,300,361
PRIMED SHELL TESTING APPARATUS
Filed Aug. 3, 1940  4 Sheets-Sheet 2
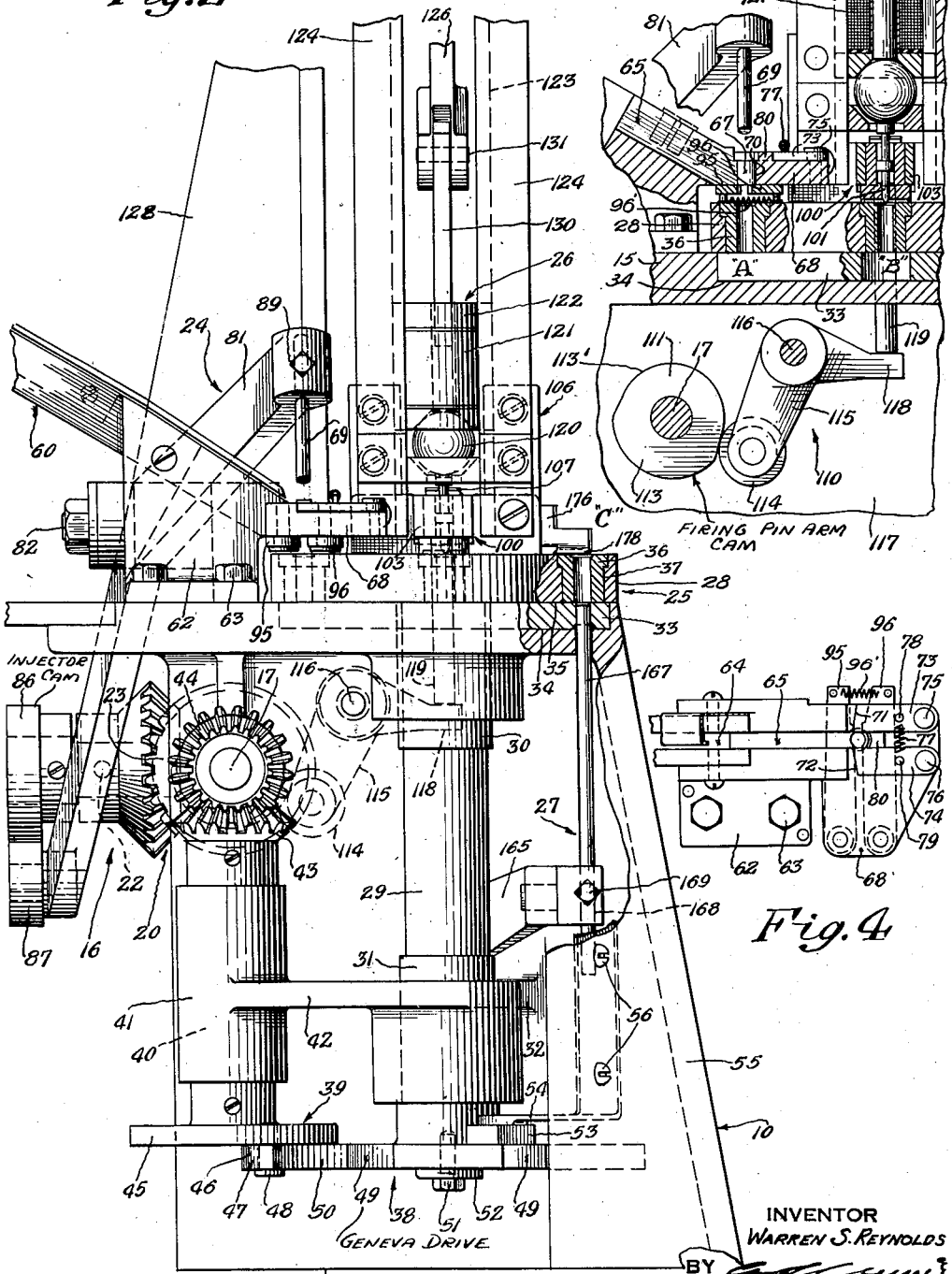
INVENTOR
WARREN S. REYNOLDS
BY
D. Verner Smythe
ATTORNEYS Oct. 27, 1942.  W. S. REYNOLDS  2,300,361
PRIMED SHELL TESTING APPARATUS
Filed Aug. 3, 1940  4 Sheets-Sheet 3
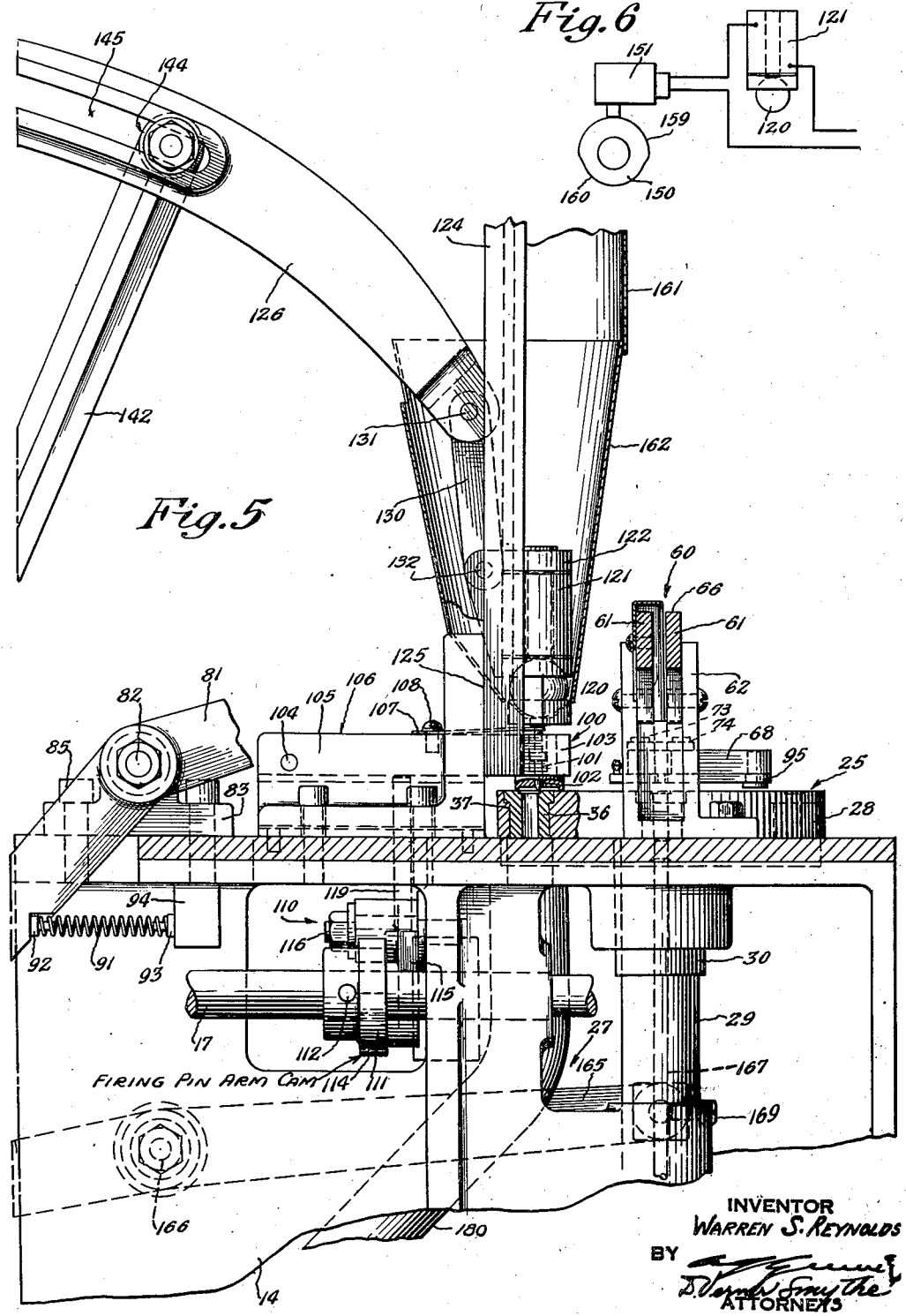

Oct. 27, 1942.   W. S. REYNOLDS   2,300,361
PRIMED SHELL TESTING APPARATUS
Filed Aug. 3, 1940   4 Sheets-Sheet 4
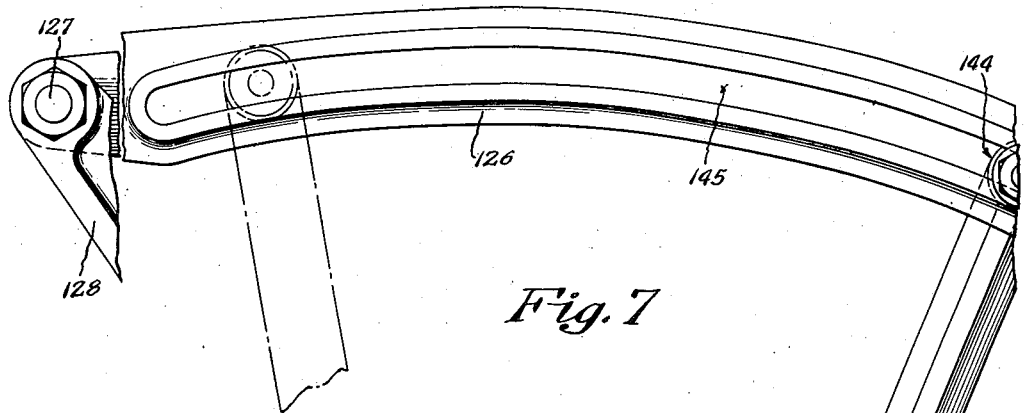
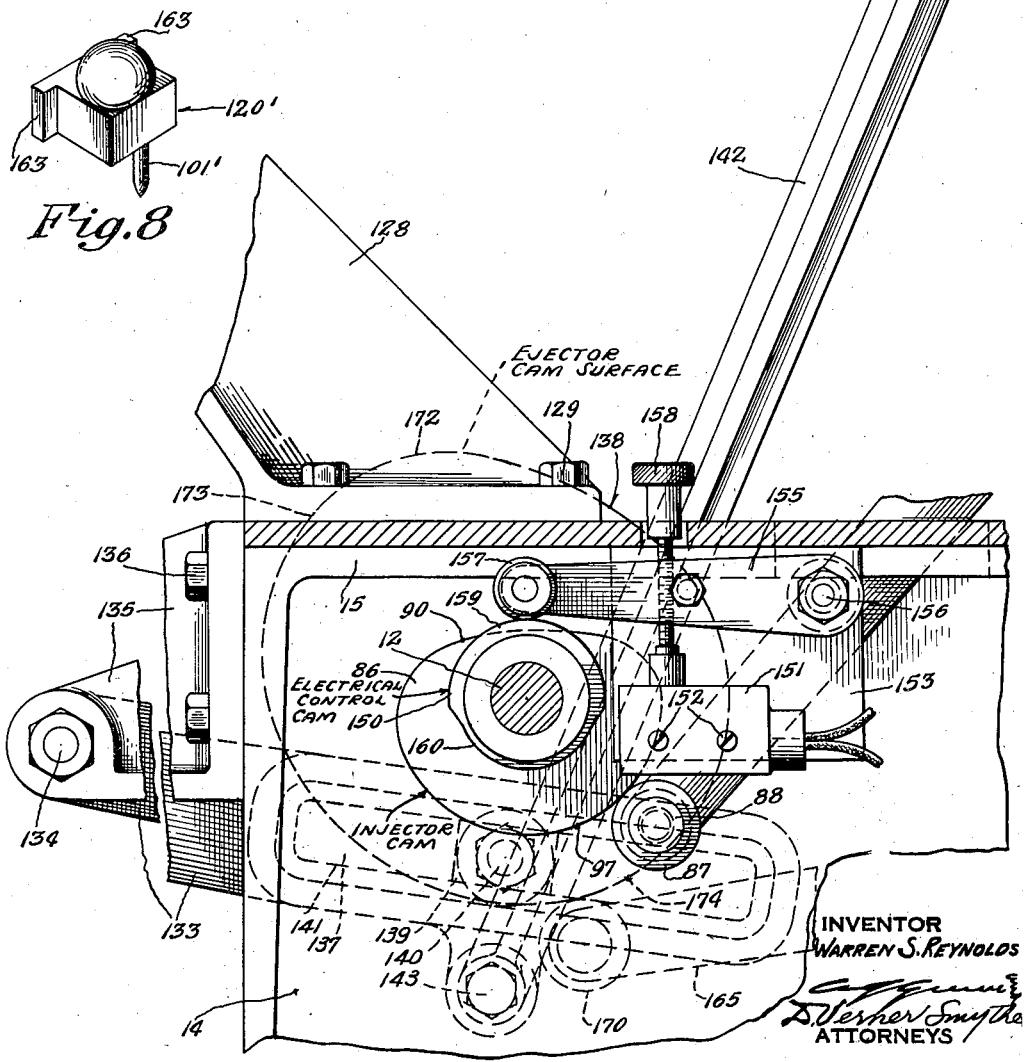

Patented Oct. 27, 1942

2,300,361

UNITED STATES PATENT OFFICE 2,300,361

PRIMED SHELL TESTING APPARATUS

Warren S. Reynolds, Stratford, Conn., assignor to Remington Arms Company, Inc., a corporation of Delaware Application August 3, 1940, Serial No. 350,911

10 Claims. (Cl. 73—51)

This invention relates to testing apparatus, and particularly to apparatus for testing prime shells.

In the manufacture of ammunition components, such as primed shells, it has been customary to make a percentage inspection (e. g., one in a hundred—one in five hundred—etc.). Heretofore the apparatus in most general use for this purpose was very inefficient, required numerous tiring manual operations and resulted in only small output.

One form of prior apparatus, now in most general use for this purpose, included a fixture with a single work holder which had to be manually loaded and unloaded successively with primed shells, and which required the operator to manually lift a striker member to a considerable height and then release the same whereupon it would drop upon a firing pin to strike the latter upon the back or flanged section of the shell, or upon a center primer of a shell, to explode the primer material if it was up to the required standard.

This old, and generally used, apparatus had very definite shortcomings including: awkward and slow loading of the work holder (the operator would have to pick up a primed shell, align the same shank down and flange up—then put it in the work holder); lifting a heavy striker, usually a full arm length above the operator's head (a very tiring operation when done many hundreds of times during a day, and often resulting in the operator failing to lift the striker the proper height before releasing the same); non-uniform testing results, caused by dust, grease or friction in runways impeding the drop or travel of the striker; awkwardly removing the tested primed shells from the work holder and disposing of the same; and, inconvenient, time-consuming, low output and very tiring conditions imposed upon the operator because of the separate, widely spaced and disconnected loading, striker lifting and unloading steps required from the operator each time each primed shell was tested.

Objectives of the present invention include the provision of: apparatus to overcome the above-mentioned short-comings of prior apparatus; a machine for automatically and efficiently testing work, such as primed shells; a machine or apparatus which will insure a more uniform test, than is possible with apparatus which is largely dependent on the skill or mood of the operator (positive lifting of the striker member to an exact predetermined height each time a shell is tested); apparatus to allow an unimpeded travel of the striker member; apparatus which will insure a very large output; apparatus in which loading, testing and/or ejecting or unloading is concurrently effected in a fully automatic manner.

Features resulting from the attainment of these objectives include the provision of: novel mechanism for automatically loading work holders, which comprises a work guide and an injector for loading work holders safely, positively and successively; a work carrier with a plurality of work holders, for moving pieces of work from a loading station to a testing station, and for making possible the testing of one piece of work at the testing station concurrently with the loading of another piece of work at the loading station; particularly novel and efficient testing mechanism, including an electromagnet for lifting a striker and releasing it at a predetermined time; adjustable mechanism for dropping the striker different extents, dependent upon the particular test desired; mechanism to quickly and easily allow changing from one to another size or weight striker; mechanism which allows the striker to drop in an absolutely unimpeded way from the release point to the firing pin; mechanism for carefully moving a firing pin down upon or close to the successive primed shells which are to be tested, and successively moving the same away therefrom to facilitate movement of the work carrier; novel mechanism for ejecting successive pieces of tested work from successive work holders in the work carrier; a novel throw member for moving the tested and ejected work out of axial alignment with the work holders and away from the work carrier; automatic mechanism for operating work loading mechanism, testing mechanism and unloading mechanism concurrently to insure a very large output.

Other objects, features and advantages will be apparent or will appear hereinafter.

In the drawings:

Fig. 2 is a fragmentary front view taken on line 2—2 of Fig. 1.

Fig. 3 is a fragmentary view of the injector and striker mechanisms taken generally on line 3—3 of Fig. 1.

Fig. 4 is a detail view of the work guiding apparatus.

Fig. 5 is a fragmentary detail of the striker and firing pin lifting mechanisms.

Fig. 6 is a wiring diagram.

Fig. 7 is a fragmentary view of the main driving mechanism.

Fig. 8 is a detail view of a modified form of striker.

Figure 1:
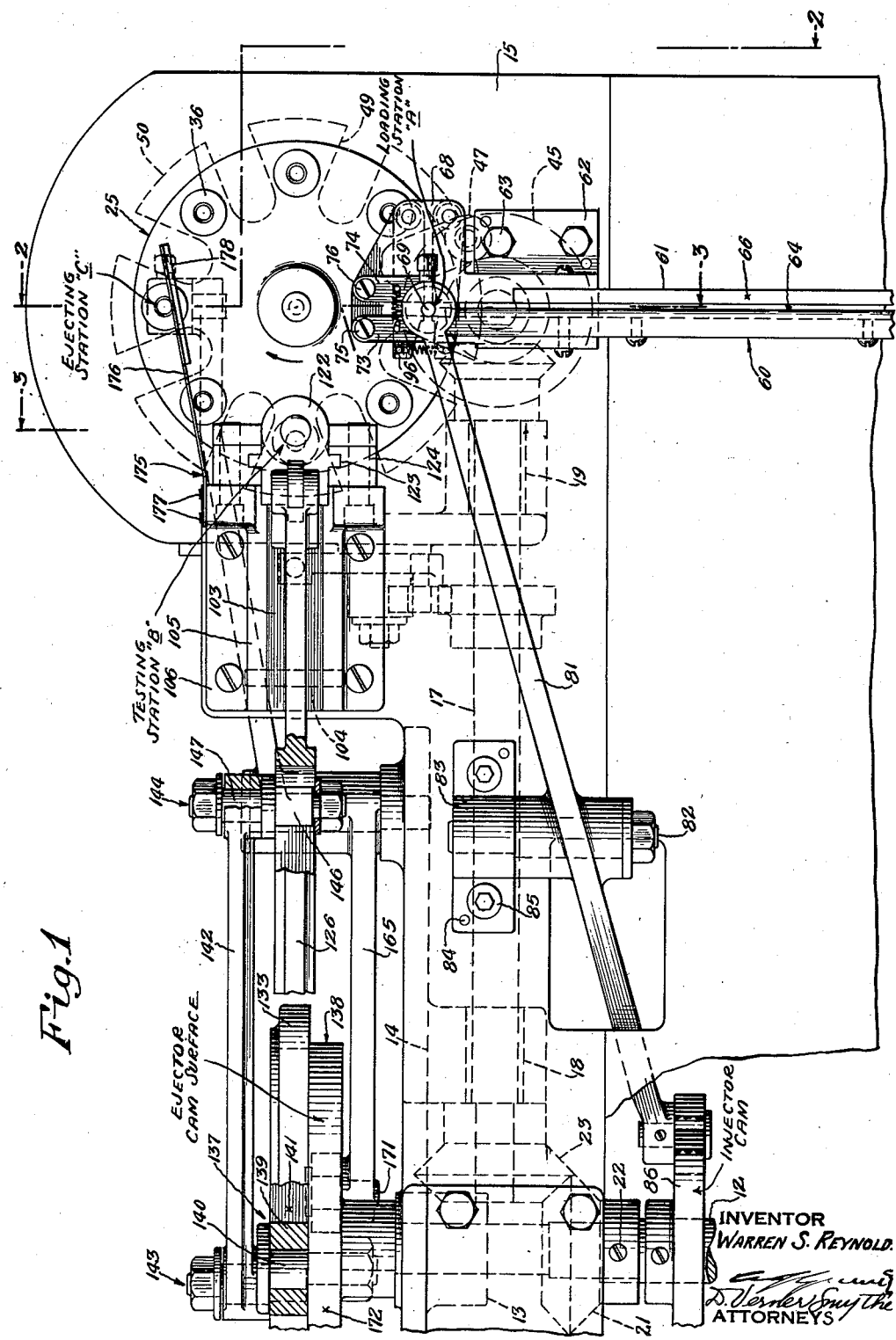
Figure 1 is a fragmentary top plan view, partly in section, of the present invention.

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

Referring now in detail to the drawings, the present invention includes a main frame 10, preferably of cast iron, which may be of any suitable general configuration. The frame may be provided with a flat lower edge 11 (Fig. 2) adapted to be set upon and secured to a work bench or the like, or may be provided with legs, in any of the usual and well-known ways.

Main drive mechanism

A main drive shaft 12 is suitably supported within the main frame 10, in suitable bearings, such as bearing 13 (Figs. 1 and 7 particularly) in a wall 14 depending from a top plate 15. This main drive shaft may be rotated by any suitable form of prime mover (e. g., electric motor connected directly or indirectly thereto; or, suitable belt, chain or the like driving connections to a line shaft).

Complemental to the main drive shaft 12 the main driving mechanism 16 includes an intermediate drive shaft 17 extending horizontally and longitudinally of the machine, below the top plate 15 (Figs. 1, 2 and 5), where it is supported for rotation in suitable bearings 18 and 19 which may be integral with or secured in suitable bores in the main frame. This intermediate shaft is rotated by a drive connection 20 including a bevelled gear 21 suitably secured to the main drive shaft 12 as by a screw 22 which in turn operates with and rotates a driven gear 23 suitably secured to the rear end of the intermediate shaft (Figs. 1 and 2).

The main driving mechanism serves to automatically operate a work injector 24, a work carrier 25, a testing mechanism 26 and ejector 27, as will now be described in detail.

Work carrier

The work carrier 25 of the present invention includes an upper plate 28 secured to the top end of a vertically disposed shaft 29 rotatably mounted in suitable bearings 30 and 31 in the top plate and a bracket 32 respectively of the main frame. Preferably the work carrier 25 includes a lower supporting plate 33 recessed and secured in a cavity 34 of the top plate and the upper plate 28 rides or rotates upon plate 33. Work holders 36 are provided in the work carrier and are preferably in the form of hardened steel bushings imbedded or otherwise suitably secured in bores 37. Preferably a plurality of work holders (eight in the present showing) are provided to insure a comparatively high-speed testing of work. This work carrier is especially adapted to move successive pieces of work from a loading station A, such as a point axially adjacent the work injector 24, to the testing station B such as the point adjacent the testing mechanism 26, and thence to an ejecting station C, such as a point adjacent the ejector mechanism 27. This movement of the work carrier may be effected manually. However, in order to insure an accurate locating of the work carrier with work into the divers stations the present invention provides a simple yet very effective indexing mechanism 38.

Indexing mechanism

The indexing mechanism 38 of the present invention, in the present preferred form, includes a Geneva mechanism 39 having a vertical shaft 40 rotatably supported in a suitable bearing 41 in a bracket 42, with a bevelled gear 43 (Fig. 3) at its upper end meshing with and driven by a cooperating bevelled gear 44 at the forward end of the intermediate shaft 17. At its lower end the shaft 40 is provided with a drive plate 45 having a driving member 46 in the form of a roller 47 rotatably mounted upon a stud 48. The drive plate is rotated counterclockwise, as viewed in Fig. 1, into successive slots 49 in an indexing plate 50 which is suitably secured, as by a bolt 51 and washer 52, to the lower end of the work carrier shaft 29 (Figs. 1, 2 and 6).

As the shaft 40 is given one complete rotation it serves to move the drive member 46 into one slot 49 and to move the indexing plate one-eighth of a turn, whereupon the driver member 46 leaves the slot 49 immediately to the left and adjacent the injector mechanism 24 (Fig. 2) whereupon the plate and driver member make approximately three-fourths of a rotation free of the indexing plate 50 during which time the work carrier is stationary and the remainder of the machine goes through the regular cycle of operations.

To insure maintaining the work carrier 25 in successive indexed stations, and to not restrain regular indexing thereof, the present invention provides a frictional pad member 53 (Fig. 2) secured to a spring member 54 suitably secured to a side wall 55 of the main frame 10 as by screws 56 (Fig. 2). This latter mechanism serves to maintain the work carrier in the indexed position even though the machine is subjected to many adverse vibrations, and even though the work carrier is inadvertently brushed or hit.

Work feed and injector mechanism

Although it is possible to manually load successive work holders 36 with primed shells (e. g., well-known metallic cartridge shells, primed, but not loaded) or other pieces of work which are to be tested in the machine, the present invention provides a novel mechanism for automatically loading the machine which in its present preferred form is shown in Figs. 1 through 5, inclusive, and includes a channelled work slide 60, which may be connected to and loaded by a suitable hopper mechanism (or may be manually loaded). This work slide includes a pair of plates 61 angularly supported upon a suitable bracket 62 secured to the top plate 15 of the main frame 10 as by bolts 63. This bracket 62 maintains the pair of plates 61 in properly spaced relation (Figs. 1, 2 and 5) spaced from each other with a channel 64 therebetween, merging with a slot 65 in the bracket, of sufficient width to clear the shank of primed shells or other pieces of work and close enough so that top edges or faces 66 thereof engage the underside of usual flanges, rims, or grooves on shells or other work to guide the same downwardly to a guide bore 67 in a bracket finger 68 underlying an injector finger 69 (Figs. 2 and 3 particularly).

Pieces of work move by gravity down the slide 60 into the guide bore 67 where they are stopped by a side wall 70 and by ends 71 and 72 of upper fingers 73 and 74. These fingers are pivotally supported upon studs 75 and 76 on the bracket 62 (Figs. 1 and 4) and are urged toward each other by a spring 77 connected to pins 78 and 79. A suitable upstanding lug 80 on the finger section 68 of bracket 62 and between the fingers 73 and 74 serves to limit movement thereof toward each other. These fingers underlie the flange, rim, or groove and prevent primed shells or the like from dropping downwardly toward the work carrier except when the injector finger 69 urges work downwardly of the fingers 73 and 74 to spread the latter against the tension of the spring 77. The arrangement is such that no new piece of work may move from the work slide 60 to the guide bore 67 unless the bore has been cleared of the preceding piece of work.

For moving the successive pieces of work from the bore 67 downwardly into successive work holders 36 in the work plate 28 the present invention provides an injector arm 81 pivotally mounted upon a stud 82 suitably secured in a bearing block 83 attached to the top plate 15 of the main frame 10 as by pins 84 and bolts 85. The injector arm is preferably operated by a cam 86 on the main drive shaft 12 engaging a roller 87 pivotally or rotatably secured to the rear end of the arm 81 as by a stud 88. Figs. 1, 2 and 7 particularly disclose the mechanism for automatically operating the injector arm.

At its forward end the injector arm 81 is provided with an injector finger 69 preferably in the form of a rod secured in proper position therein by a screw 89. The forward end of the arm 81 may be made heavy enough, or have weight added thereto, to cause the forward end of the arm and injector finger 69 to move by gravity toward the work holders 36 whenever a low lobe 90 on the cam 86 permits. However, to insure movement thereof a compression spring 91 (Fig. 5) suitably supported between pins 92 and 93 on the arm 81 and on a suitable bracket 94, respectively, may be provided. This compression spring insures maintaining the roller 87 against the cam 86 and insures travel of the injector finger 69 downwardly upon successive pieces of work to force the work through the guide bore 67 and top fingers 73 and 74 and thence through a somewhat similar lower set of fingers 95 and 96 at the underside of the finger 68, or projection of the bracket 62 (Figs. 3 and 4) fully into the underlying work holder 36. Spring 96' serves to urge fingers 95 and 96 together.

High and low lobes 97 and 90, respectively, on the cam 86 are so proportioned that they serve to force successive pieces of work from the bore 67 into successive work holders 36 only while the work carrier 25 is stationary thereunder.

Testing mechanism

Testing mechanism 26 provided by the present invention is very efficient and novel and should, therefore, be particularly noted. In its present preferred form it includes the firing mechanism 100 (Fig. 5) including a firing pin 101 mounted for reciprocation in a suitable bore 102 at the forward end of a movable block 103 pivotally mounted on a stud 104 between side walls 105 of a bracket 106 (Figs. 2, 3 and 5). A flat spring 107 (Fig. 5) is secured to the top of the block 103 as by a screw 108 and serves to maintain the firing pin in a raised position in the block 103. The firing pin may be of any desired configuration and preferably has a lower striker point substantially like the point of the firing pin in the guns intended to receive completed cartridges made from primed shells like those being tested.

A lift mechanism 110 is provided upon the underside of the machine, below the top plate 15, to normally lift the movable block 103 and firing pin 101 out of the path of the work carrier 25, and to allow the firing pin to be placed gently upon or directly above successive pieces of work. This lift mechanism 110 includes a cam 111 secured to the intermediate shaft 17 as by a pin 112 (Figs. 1, 2, 3 and 5). The cam has a riser or lifting lobe 113 engaging a roller 114 on the lower end of a bell crank 115 to arcuately move the latter about a stud 116 suitably secured to a depending wall 117. An integral finger 118 on the bell crank engages a slide rod 19 mounted for vertical reciprocation in suitable bearings in the top plate 15. The upper end of the slide rod underlies the pivotally mounted block 103 to kick the block in a counterclockwise direction, as viewed in Fig. 5, and to allow the block to drop in a clockwise direction.

It is an important and critical point of the test to strike the firing pin 101 upon successive pieces of work with exactly the same force, and the present invention provides a particularly advantageous mechanism to achieve this. For this purpose the present invention provides a free falling striker 120, such as a large ball, adapted to be lifted by an electromagnet 121. The latter is secured to a slide 122 located and guided in suitable channels 123 in upstanding bars 124 secured to a front face 125 on the bracket 106.

It is possible to manually lift the slide 122, the associated electromagnet 121 and the striker 120 a given height each time it is desired to hit the firing pin 101, and test product. However, the present invention provides a mechanism for automatically lifting the striker 120 and slide 122, including an upper arm 126 pivotally mounted upon a stud 127 at the rear and top end of a bracket 128 secured as by bolts 129 to the top plate 15 of the main frame (Fig. 7). At its forward end the pivoted upper arm 126 is, through a link 130 and pins 131 and 132, connected to the striker slide 122.

Mechanism for automatically lifting the upper arm 126 and slide 122 includes a lower arm 133 pivotally mounted upon a stud 134 in a bracket 135 secured to a rear wall of the main frame 10 as by bolts 136. This pivoted lower arm has a pin and slot connection 137 with a face plate 138 suitably secured to the outer end of the main drive shaft 12 (Fig. 1). The connection 137 preferably includes a rectangular slide block 139 pivotally secured to the face plate 138 as by a shoulder stud 140 which has a head thereon overlying the pivoted lower arm 133 and locating the latter relative to the face plate. The rectangular slide block moves within a slot 141 of the lower arm as the face plate 138 and stud 140 thereon rotate. A long link 142 has a pivot connection 143 upon the pivoted lower arm 133 (Figs. 1 and 7) and has a suitable adjustable connection 144 within a channel or slot 145 in the upper arm 126. The adjustable connection comprises a stud with a flattened section 146 fitting in the slot 145 and a nut to clamp it therein. Also, it includes a shank 147 adapted to pivotally receive the link 142.

This lifting mechanism is such that the lower arm 133 and the link 142 are given a uniform movement upon the rotation of the face plate 138, and the upper arm 126 is given various extents of arcuate movement by the link 142 according to the position of the adjustable connection 144 in the channel 145. Thus, if the adjustable connection is secured to the upper arm near the forward end thereof, as shown in Fig. 5, the upper arm is given only a slight extent of arcuate movement. On the other hand, if the adjustable connection 144 and upper end of the link 142 is secured in the rear end of the channel, as shown by dot-and-dash lines in Fig. 7, the forward or free end of the upper arm 126 is given a large amount of arcuate movement. This mechanism is such that the lowermost position of the upper arm is always substantially the same and that the variable extent or positioning thereof is at the upper part of the movement.

A cam 150 (Figs. 6 and 7) is also provided upon the main drive shaft 12 to operate a switch 151 which controls the current to the electromagnet 121. This switch may be of any suitable type and may be secured as by screws 152 to the side of a depending lug 153 on the underside of the main frame. Said depending lug also provides a suitable pivotal connection for a switch control arm 155. Preferably, the latter is pivotally mounted upon a stud 156 and carries a roller 157 at the outer or free end thereof, adapted to engage the switch control cam 150 (Fig. 7). An adjustment screw 158, suitably threaded in the switch control arm 155, is provided to adjust or make minor settings of the switch 151. The location and sizes of lobes 159 and 160 on the switch cam 150 are designed to close the switch when the electromagnet 121 is in the lowermost position, shown in Figs. 2 and 3, and to de-energize the electromagnet when the upper arm 126 and slide member 122 are in the upper position, whereupon the striker 120, or ball, is allowed to drop directly upon the firing pin 101.

Thus, it will be seen that the present invention provides a uniform, positive and automatic means for moving a striker 120 of a particular weight an exact preferred distance each time a piece of work is to be tested and allows the striker to be dropped without friction or other impediments.

In addition to dropping the striker 120 divers predetermined extents, slightly larger or smaller strikers 120 (large or small balls) may be used in the same apparatus when it is desired to test work under different conditions.

The testing apparatus also includes a guard 161 secured to the upright bars 124 and overlying the electromagnet 121 and slide 122 to keep the same dust free. The guard is at its lower end provided with a converging section 162 adapted to centralize and direct the free falling striker 120 upon the firing pin 101 if for any reason it should happen to be deflected from its normal free path of travel. More particularly, the converging section 162 serves to centralize the striker member 120 upon the firing pin 101 after its operative travel so that it is substantially in the right position to be picked up by the electromagnet 121 when the latter is energized, and is about to be lifted by the upper arm 126.

A modified form of the striker is disclosed in Fig. 8, including a slide striker 120' adapted to be lifted by the electromagnet and directed in a defined path as by tongues 163 thereon in channels 123 of the vertical bars 124 to the firing pin 101. However, grease and dirt in the bar slots may prevent or deter free movement thereof, and it is therefore perhaps a less satisfactory form of the invention. The striker member may be lifted and released by the electromagnet in the same manner as the striker ball 120. The striker 120' may be slightly convex at the underside to approximate the bottom of the ball striker 120, or it may, as shown, be provided with an integral firing pin 101', thereby dispensing with the firing mechanism 100.

*Ejector mechanism*

The present invention provides a simple form of ejector mechanism 27 for moving successive pieces of work from the work holders 36 and thereby prepare the same for new pieces of work. In its present preferred form, this ejector mechanism includes an ejector arm 165 pivotally mounted upon a stud 166 secured to the side wall 14 of the main frame 10, with an ejector finger 167 in the form of a rod secured in the desired position in a bore 168 at the forward end thereof by a screw 169. This ejector arm is at its rear end provided with a roller 170 on a stud 171, adapted to engage an outer edge cam 172, on the face plate 138, shaped with high and low lobe sections 173 and 174 respectively. When the high lobe 173 engages the roller 170 the ejector arm is moved in a counterclockwise direction, as shown in Fig. 7, to move the ejector pin 167 upwardly through the coaxial work holder 36 and to lift the piece of work therein entirely clear of the work holder. Similarly, the low lobe 174 thereon allows the ejector finger to be moved downwardly and entirely clear of the work holder. Preferably, the forward end of the ejector arm is made heavier than the rear end thereof, or has a weight hooked thereto, so that it drops clear of the work holders and work carrier 25 entirely by gravity when the roller 170 engages the low lobe. However, it may be provided with a spring such as the compression spring 91 of the injector arm to insure movement thereof clear of the work holders 36 at desired and periodic points in the operation of the machine.

To further move work from the work carrier 25 the present invention provides a throwing device 175 including a throw member 176 such as a flat spring member suitably secured to the bracket 106 by screws 177 with a slightly bevelled lower section 178 overlying the successive work holders 36 at the ejector station C. This throw member 176 is preferably proportioned and located over the work holders 36 at the ejector station a sufficient extent so that as successive pieces of work are moved upwardly out of the work holders 36 by the ejector finger 167 the throw member 176 is initially pushed back (downwardly as viewed in Fig. 1 and to the left as viewed in Fig. 2) until the work is entirely free of the work holder, whereupon the yielding and pushed-back throw member snaps or throws the work clear of the work holder.

*Operation of the machine*

Operation of the machine may be briefly described as follows:

The work feed slide 60 may be suitably filled with pieces of work whereupon the lowermost piece of work therein moves into the guide bore 67 of the block 62 coaxially of and above the work holder 36 at the loading station A. The main drive shaft 12 is then rotated in any suitable manner as hereinbefore described, whereupon the cam 86 on the main drive shaft 12 allows the injector arm 81 to be moved in a clockwise direction as viewed in Fig. 5 so that the injector finger thereon forces the immediately underlying piece of work in the guide bore through the top set of fingers 73 and 74 and thence through the lower set of fingers 95 and 96 downwardly fully into the coaxial work holder 36 at the loading station whereupon the cam 86 moves the arm 81 in a counterclockwise direction so that the injector finger is again in the raised inoperative position shown in Figs. 2 and 3.

Further rotation of the main drive shaft through the gears 22 and 23 effects rotation of the intermediate shaft 17 and the bevelled gears 43 and 44 at the forward end of the latter shaft to effect rotation of the drive plate 45 at the lower end of the vertical shaft 40 whereupon the roller 47 thereon moves into successive slots in the index plate 50 to move the work carrier 25 and particularly work holders 36 in a step-by-step manner toward the testing mechanism 26 and to move the loaded work carrier into the testing position B.

As the work holders 36 are moved into the testing position B the cam 111 upon the intermediate shaft 17, and particularly the low lobe 113' thereon allows the bell crank 115 to be moved in a counterclockwise direction whereupon the finger 118 allows the rod 119 and the block 103 to be moved down whereupon the firing pin 101 is brought into the desired position above the primed shell at the testing station.

Prior to the work holder and work being moved to the testing position B, or while they are being moved to that position, the slide block 139 on the face plate 138 through the lower arm 133 and link 142 moves the upper arm 126 in a counterclockwise direction as viewed in Figs. 5 and 7 to lift the slide member 122 and the striker 120 into the desired raised position.

When the arm is in the uppermost position the cam 150 operates the switch 151 to de-energize the electromagnet 121 whereupon the striker 120 is released so that it may drop freely upon the firing pin 101. The usual test in this apparatus is to subject the firing pin to somewhat less than the force it would be subjected to in regular field use in setting off completed cartridges. If the priming of the primed shells is inadequate in any way this test will fail to explode the shell, and the shells appear bright and new as they are ejected from the apparatus. However, if the primer is set off the shell becomes discolored, and shows up "all right" at the point of ejection.

In the manufacture of ammunition components, such as primed shells, it is desirable to make a percentage check of the primed shells (viz., one in a hundred—one in five hundred—etc.) to be sure that the priming material is satisfactory and to be sure that the usual carefully checked amount of priming material is sufficient. Preferably, a duct 180 is provided underneath the work carrier 25 at the testing station, connected to a suitable exhaust system, to carry off the fumes from the exploded or fired primer material.

Immediately after the striker 120 is released the slide member 122, through the upper arm 126 and associated controlling mechanism, is moved downwardly substantially into the position shown in Figs. 3 and 6, whereupon the electromagnet through the cam 150 and switch 151 is again energized to lift the striker into the raised position again. Concurrently with the movement of a work holder 36 from the testing position B to the ejecting position C the high lobe 113 on the cam 111 through the associated mechanism moves the pivoted block 103 and firing pin 101 into the raised position. Also, the switch cam 150 and the slide block 139 through the lower and upper arms 133 and 126 respectively move the slide member 122 and striker 120 to the raised position.

When the primed shells or other work reach the ejector position C and the work carrier is brought to rest with a work holder in that position, the edge cam 172 on the face plate 138 kicks the ejector arm into the ejecting position; viz., moves the ejector finger upwardly completely through the work holder 36 from the lowermost position shown in Fig. 2, whereupon the throw finger 176 is initially and yieldingly pushed back and then serves to throw the ejected work from the face of the work carrier to a suitable container. Successive pieces of work pass through this complete cycle of operations.

Because the loading, testing and ejecting may occur concurrently at divers stations in the machine a very large volume of output is insured; in fact, several hundredfold greater than with manual testing methods in current practice at the present time.

While the present invention is particularly advantageous for testing ammunition components, it will be appreciated that it may be readily used for other products. It should be understood that a solenoid can be used just as well and in place of the electromagnet—and use of the term electromagnet herein is intended to embrace such a structure.

Other variations and modifications may be made within the scope of this invention, and portions of the improvements may be used without others.

Having thus described the invention, what is claimed as new is:

1. In a continuously operating ammunition component testing apparatus, the combination of a frame; a movable plate; means for loading components into spaced work holders carried by said plate; means for advancing the plate cyclically from the loading station to a test station; a freely falling striker means; means located at the test station for automatically elevating and releasing said striker means in timed relation to the arrival of a component at the station; means for unloading components from the plate; and driving mechanism having connections between the loading means, the plate advancing means, the elevating and releasing means, and the unloading means, thereby operating the same in sequence incident to a test.

2. In a continuously operating ammunition testing apparatus, the combination of a frame; an indexable plate; means for loading components into spaced work holders carried by said plate; means for advancing the plate cyclically from the loading station to a test station; a firing mechanism; a freely falling striker means; means for automatically lifting and releasing said striker means in timed relation to the arrival of a shell at the test station; vertical guides for said lifting means; means for reciprocating said lifting means; and a converging wall means for directing the free falling means to the firing mechanism.

3. In a testing apparatus for ammunition components, the combination comprising a main frame; a movable work holder; means to move the work holder; a firing mechanism including a pivoted arm overlying the work holder and having a firing pin resiliently mounted therein; a striker; automatic lifting means for the striker; means to release the striker so that it will fall and operate the firing pin to test a component; means to move the pivoted arm away from the work holder after a test; and a driving mechanism having connections with the work holder, lifting means and the pivoted arm, thereby operating the same in sequence incident to a test.

4. In a testing apparatus for ammunition components, the combination comprising a main frame; a feed slide; a movable work carrier; a pivoted arm for moving and loading work from said slide to spaced points on the carrier; means for moving the carrier cyclically to a test station from the loading station and after a test to an ejecting station; firing mechanism including a pivoted arm overlying the carrier and having a firing pin; automatic means to operate the firing pin; a pivoted arm for ejecting components after being tested; and a driving mechanism having connections with the loading means, carrier moving means, testing means and ejector means, thereby operating the same in sequence incident to a test.

5. In a testing apparatus for ammunition components, the combination comprising a frame; an indexable work carrier having spaced work holding bores; means for placing components in said bores; a reciprocating ejector pin for moving a component upwardly out of a bore; and a resilient finger which is flexed as the component is moved upwardly in the bore, the flexed finger moving the component sidewise as the component clears the bore.

6. In a continuously operating ammunition component testing apparatus, the combination of a frame; a movable plate; means for loading components onto said plate in spaced positions; means for advancing said plate to move the components from a loading to a testing station; a firing mechanism at said testing station including a striker and an oscillating link for lifting said striker, said link having an operating means adjustably connected thereto so as to vary the upward movement of the striker; means to release the striker to test a component; and driving mechanism to advance the plate and oscillate the link in sequence incident to a test.

7. In a continuously operating ammunition component testing apparatus, the combination of a frame; a movable plate having spaced work holders; means for loading components into said work holders; means for advancing said plate cyclically step-by-step from a loading station to a test station and after a test, to an ejecting station; electrically controlled means located at the test station for auomatically raising and releasing a striker mechanism in timed relation to the arrival of a shell at the station; driving mechanism including a main power shaft having connections with the loading means, the plate advancing means, and releasing means, thereby operating the same in sequence incident to a test; and friction means to engage the plate and hold the same stationary between movements thereof.

8. In a continuously operating ammunition testing apparatus, the combination of a frame; a work feed slide; a rotatable work carrier having a plurality of spaced work holders; loading means comprising a pivoted arm carrying a pin adapted to engage and move work from said feed slide into the work holders; indexing means for transmitting intermittent motion to said carrier for cyclically moving the same from a loading to a test station and from said test station to an ejecting station; firing mechanism comprising a firing pin, and pivoted block having resilient means for supporting said firing pin; automatic means for elevating and releasing a striker mechanism in timed relation to the arrival of a shell at the test station; work ejecting means comprising a reciprocating pin adapted to lift the work upwardly from said work holder; and driving means having connections between said indexing means, loading means, firing mechanism and ejecting means, thereby operating the same in sequence incident to a test.

9. In a continuously operating primed shell testing apparatus, the combination comprising a frame; means for loading the shells into spaced pockets of a rotary indexable plate; means for advancing the plate cyclically from the loading station to a test station, and after a test, to an ejecting station; electrically controlled means located at the test station for auomatically elevating and releasing a striker mechanism in timed relation to the arrival of a shell at said station; a main power shaft; and cam operated means controlled by the main power shaft for operating the loading, advancing, and electrically controlled means in sequence incident to a test.

10. In a continuously operating primed shell testing apparatus, the combination comprising a frame; means for loading the shells into spaced pockets of a rotary indexable plate; means for advancing the plate cyclically from the loading station to a test station and after a test to an ejecting station; electro-magnetic means located at the test station for automatically elevating and releasing a striker mechanism in timed relation to the arrival of a shell at said station; switch means for controlling said electro-magnet; ejecting means to move the tested shell out of the plate; a main power shaft; and cam operated means controlled by the main power shaft for operating the loading, advancing, switch, and ejecting means in sequence incident to a test.

WARREN S. REYNOLDS.